United States Patent
Jeon

(10) Patent No.: US 10,582,390 B2
(45) Date of Patent: Mar. 3, 2020

(54) METHOD AND APPARATUS FOR COOPERATIVE COMMUNICATION IN WIRELESS COMMUNICATION SYSTEM

(71) Applicant: Samsung Electronics Co., Ltd., Suwon-si, Gyeonggi-do (KR)

(72) Inventor: Joseph Jeon, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 26 days.

(21) Appl. No.: 15/767,018

(22) PCT Filed: Oct. 10, 2016

(86) PCT No.: PCT/KR2016/011292
§ 371 (c)(1),
(2) Date: Apr. 9, 2018

(87) PCT Pub. No.: WO2017/065464
PCT Pub. Date: Apr. 20, 2017

(65) Prior Publication Data
US 2018/0310183 A1    Oct. 25, 2018

(30) Foreign Application Priority Data

Oct. 13, 2015 (KR) .......................... 10-2015-0142877

(51) Int. Cl.
*H04L 12/28* (2006.01)
*H04W 16/04* (2009.01)
(Continued)

(52) U.S. Cl.
CPC ........... *H04W 16/04* (2013.01); *H04L 5/0053* (2013.01); *H04W 24/02* (2013.01); *H04W 24/10* (2013.01);
(Continued)

(58) Field of Classification Search
CPC ..... H04W 16/04; H04W 24/02; H04W 24/10; H04W 72/0426; H04W 88/08; H04W 88/12
(Continued)

(56) References Cited

U.S. PATENT DOCUMENTS

2010/0150076 A1    6/2010 Nakata
2013/0034038 A1    2/2013 Jang et al.
(Continued)

FOREIGN PATENT DOCUMENTS

KR    10-2013-0077815 A    7/2013
KR    10-2014-0114759 A    9/2014
(Continued)

OTHER PUBLICATIONS

Extended European Search Report dated Jul. 26, 2018, issued in the European patent application No. 16855681.9.

*Primary Examiner* — John Pezzlo
(74) *Attorney, Agent, or Firm* — Jefferson IP Law, LLP

(57) ABSTRACT

A method for cooperative communication of electronic devices in a wireless communication system and an apparatus therefor are disclosed. The method includes the operations of predicting a resource level of each base station based on information received from a plurality of base stations, determining base stations having a resource level equal to or less than a set reference level among the plurality of base stations, configuring available resource information of the determined base stations as different values as the available resource information of the rest of the base stations, and transmitting the configured available resource information.

18 Claims, 12 Drawing Sheets

(51) Int. Cl.
*H04W 24/10* (2009.01)
*H04W 88/08* (2009.01)
*H04W 72/04* (2009.01)
*H04L 5/00* (2006.01)
*H04W 24/02* (2009.01)
*H04W 28/08* (2009.01)
*H04W 88/12* (2009.01)
*H04J 1/16* (2006.01)

(52) U.S. Cl.
CPC ....... *H04W 28/08* (2013.01); *H04W 72/0426* (2013.01); *H04W 88/08* (2013.01); *H04W 88/12* (2013.01)

(58) Field of Classification Search
USPC .......................... 370/252, 329, 230
See application file for complete search history.

(56) References Cited

U.S. PATENT DOCUMENTS

| | | |
|---|---|---|
| 2014/0029531 A1 | 1/2014 | Chang et al. |
| 2014/0287788 A1 | 9/2014 | Jeon et al. |
| 2014/0313915 A1 | 10/2014 | Lee et al. |
| 2014/0357287 A1 | 12/2014 | Han |
| 2015/0092704 A1* | 4/2015 | Chen ................. H04W 72/1231 370/329 |
| 2015/0131594 A1* | 5/2015 | Harada ............... H04W 72/048 370/329 |
| 2016/0088647 A1 | 3/2016 | Yi et al. |
| 2016/0100397 A1 | 4/2016 | Wen et al. |
| 2016/0255546 A1 | 9/2016 | Sun |
| 2017/0063503 A1* | 3/2017 | Liu ....................... H04L 5/0044 |
| 2018/0006780 A1 | 1/2018 | Jeon et al. |

FOREIGN PATENT DOCUMENTS

| | | |
|---|---|---|
| KR | 10-2016-0089238 A | 7/2016 |
| WO | 2014/180441 A1 | 11/2014 |
| WO | 2014/181177 A1 | 11/2014 |
| WO | 2014/185647 A1 | 11/2014 |

* cited by examiner

FIG. 3

| Time frame # | t | t+1 | t+2 | t+3 | t+4 |
|---|---|---|---|---|---|
| UE CSI list {UE #k CSI information, UE #k+1 CSI information,..., UE #n CSI information} | UE #k | | UE #k | UE #k+4 | UE #k+1 |
| | UE #k+1 | | | | UE #k+4 |
| | UE #k+2 | | | | |

Destination Cell ID : A, B, C                                          400

| Cell ID | T | T+1 | T+2 | T+3 | T+4 |
|---------|---|-----|-----|-----|-----|
| A       | 1 | 0   | 0   | 1   | 1   |
| B       | 0 | 1   | 1   | 1   | 0   |
| C       | 1 | 1   | 1   | 0   | 0   |

FIG. 5

Destination Cell ID : A                                                500

| Cell ID | T | T+1 | T+2 | T+3 | T+4 |
|---------|---|-----|-----|-----|-----|
| A       | 1 | 1   | 1   | 1   | 1   |
| B       | 0 | 1   | 1   | 1   | 0   |
| C       | 1 | 1   | 1   | 0   | 0   |

505

Destination Cell ID : B, C                                             510

| Cell ID | T | T+1 | T+2 | T+3 | T+4 |
|---------|---|-----|-----|-----|-----|
| A       | 0 | 0   | 0   | 0   | 0   |
| B       | 0 | 1   | 1   | 1   | 0   |
| C       | 1 | 1   | 1   | 0   | 0   |

| Cell ID | T | T+1 | T+2 | T+3 | T+4 | 1000 |
|---|---|---|---|---|---|---|
| A | 1 | 0 | 0 | 1 | 1 | |

| Cell ID | T | T+1 | T+2 | T+3 | T+4 | 1005 |
|---|---|---|---|---|---|---|
| C | 1 | 1 | 1 | 0 | 0 | |

| Cell ID | T | T+1 | T+2 | T+3 | T+4 | 1010 |
|---|---|---|---|---|---|---|
| A | 1 | 0 | 0 | 1 | 1 | |
| C | 1 | 1 | 1 | 0 | 0 | | ns

METHOD AND APPARATUS FOR COOPERATIVE COMMUNICATION IN WIRELESS COMMUNICATION SYSTEM

PRIORITY

This application is a U.S. National Stage application under 35 U.S.C. § 371 of an International application number PCT/KR2016/011292, filed on Oct. 10, 2016, which is based on and claimed priority of a Korean patent application number 10-2015-0142877, filed on Oct. 13, 2015, in the Korean Intellectual Property Office, the disclosure of which is incorporated by reference herein in its entirety.

TECHNICAL FIELD

The present disclosure relates to a method and an apparatus for cooperative communication in a wireless communication system.

BACKGROUND ART

Initial stage wireless communication systems have been developed to provide a voice service while securing activity of a user. However, the wireless communication system gradually extends an area from a voice service to a data service. At present, the wireless communication system has been developed to provide a high-speed data service.

The wireless communication system may include a radio access network (RAN). Components of a radio access network that interacts with a terminal may communicate with a terminal via an air interface. The remaining components of the wireless communication system may be mostly connected to the terminal in a wired manner.

A radio access network component that interacts with the terminal via the air interface may include some of, for example, an evolved Node B (eNB), a node B (NB), or a radio network subsystem (RNS) including the same, a base transceiver station (BTS) or a base station subsystem (BSS) including the same, a radio access point, a home eNB, a home NB, a home eNB gateway (GW), and X2 GW. In the present specification, for convenience, the term base station will be used to refer to at least one of the examples of the radio access network components listed above or the radio access network itself.

A base station may be configured of one or more cells. A cell governs a specific range, and the terminal is serviced within a range of cells. Here, the cell means a cell of a cellular system, and the base station means a device for managing and controlling the cell. However, in the present specification, for convenience, the cell and the base station may be used as the same meaning. For example, even in describing the embodiment, the cell and the base station may be interchanged with each other for convenience.

Since the base station provides services to the terminal via the air interface, each base station has adequate coverage to provide the service.

DISCLOSURE OF INVENTION

Technical Problem

An object of the present disclosure is directed to provision of a method for efficiently using, by base stations having a small data amount, resources in a situation where available resource information of each base station is shared based on inter-base station cooperative communication.

Another object of the present disclosure is directed to provision of a method for efficiently using, by base stations having a small data amount, resources in a distributed cooperative communication situation as well as a centralized cooperative communication situation.

Solution to Problem

Various embodiments of the present disclosure are directed to the provision of a method for cooperative communication in a wireless communication system including: predicting a resource level of each base station based on information received from a plurality of base stations; determining base stations having the resource level equal to or less than a set reference level among the plurality of base stations; and configuring available resource information of the determined base stations as different values as the available resource information of the rest of the base stations and transmitting the configured available resource information.

Various embodiments of the present disclosure are directed to the provision of an electronic device, including: a transceiver configured to transmit and receive a signal to and from a plurality of base stations; and a controller configured to perform a control to predicting a resource level of each base station based on information received from a plurality of base stations, determining base stations having the resource level equal to or less than a set reference level among the plurality of base stations, and configuring available resource information of the determined base stations as different values as the available resource information of the rest of the base stations and transmitting the configured available resource information.

Various embodiments of the present disclosure are directed to the provision of a method for cooperative communication in a wireless communication system including: receiving terminal-related information connected through a cell of each base station from another base station; predicting the resource level of the base station based on the terminal-related information connected through the cell of the base station and the received terminal-related information; and configuring available resource information of the base station to be a value indicating a resource use restriction when the resource level is equal to or less than a set reference level and transmitting the configured available resource information to the another base station.

Various embodiments of the present disclosure are directed to the provision of a base station including: a transceiver configured to transmit and receive a signal to another base station; and a controller configured to perform a control to receive terminal-related information connected through a cell of each base station from the another base station, predict a resource level of the base station based on the terminal-related information connected through the cell of the base station and the received terminal-related information, and configure the available resource information of the base station to be a value indicating a resource use restriction when the resource level is equal to or less than a set reference level and transmit the configured available resource information to the another base station.

Advantageous Effects of Invention

According to the embodiment of the present disclosure, it is possible to efficiently manage the resource use of each base station in consideration of the data level of each base station in the inter-base station cooperative communication situation.

BRIEF DESCRIPTION OF DRAWINGS

FIG. 3 is a diagram illustrating an example of information transmitted from a base station to a resource coordinator in a centralized inter-base station cooperative communication situation according to an embodiment of the present disclosure.

FIG. 4 is a diagram illustrating an example of the information transmitted from the resource coordinator to the base station in the centralized inter-base station cooperative communication situation according to the embodiment of the present disclosure.

FIG. 5 is a diagram illustrating another example of the information transmitted from the resource coordinator to the base station in the centralized inter-base station cooperative communication situation according to the embodiment of the present disclosure.

FIG. 10 is a diagram illustrating an example in which the base stations share the resource use coordination result information in the distributed cooperative communication according to another embodiment of the present disclosure.

MODE FOR THE INVENTION

Hereinafter, embodiments of the present disclosure will be described in detail with reference to the accompanying drawings. Hereinafter, if it is determined that the detailed description of the known art related to the present disclosure may obscure the gist of the present disclosure, the detailed description thereof will be omitted. Further, the following terminologies are defined in consideration of the functions in the present disclosure and may be construed in different ways by the intention or practice of users and operators. Therefore, the definitions thereof should be construed based on the contents throughout the specification.

Further, in describing in detail embodiments of the present disclosure, a radio access network, long term evolution (LTE) that is a core network, and an evolved packet core (EPC) that are defined by the 3rd generation partnership project (3GPP) will be described as a major object. However, a main subject of the present disclosure may be slightly changed to be applied to other communication systems having similar technical backgrounds without greatly departing the scope of the present disclosure, which may be determined by those skilled in the art to which the present disclosure pertains.

Figure 1:
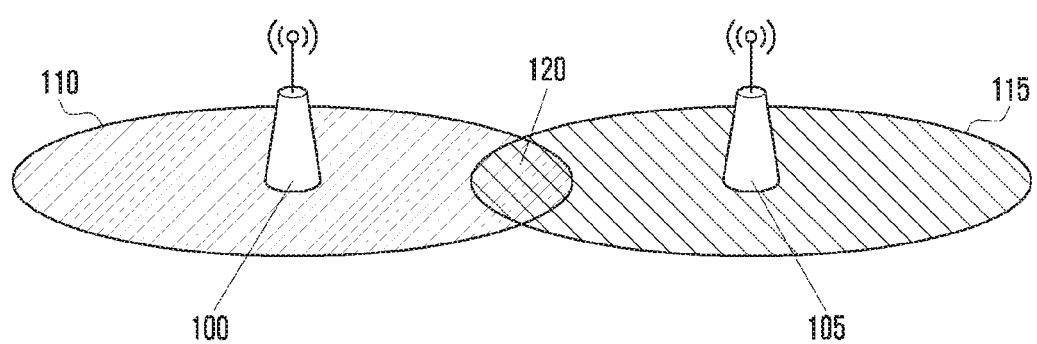
FIG. 1 is a diagram for explaining overlapping of cell coverage in a wireless communication system.

FIG. 1 is a diagram for explaining overlapping of cell coverage in a wireless communication system.

Referring to FIG. 1, two neighboring generic base stations 100 and 105 each have coverage 110 and 115. At this time, there may be a region 120 where the two coverage 110 and 115 overlap each other. A terminal located in the overlapping region 120 may experience strong interference due to at least one of the two base stations 100 and 105. For example, if the terminal is serviced by the base station 100, the terminal may experience the strong interference due to the base station 105.

FIG. 1 shows a case where base stations 100 and 105 have the coverage 110 and 115 having a similar width. However, the situation to be considered in the present specification is not limited thereto. In addition, the situation where the coverage 110 of the base station 100 is included in the coverage 115 of another base station 105, the situation where the coverage of three or more base stations has a commonly overlapping region, and the interference situation due to the overlapping coverage in other situations may be considered.

Also, the overlapping coverage 120 may not only cause interference between the base stations 100 and 105, but may also cause frequent signaling. The signaling may include, for example, handover related signaling.

To save energy of the base stations 100 and 105, the system may turn on and off each base station 100 and 105 or adjust transmission power. It may not be preferable if any area does not belong to the coverage of any base station, so special care may be needed when the turning on/off the base stations 100 and 105 or the adjustment of the transmission power is performed.

Recently, the 3rd generation partnership project (3GPP) has developed a technology of allowing the plurality of base stations 100 and 105 to perform cooperative communication with each other to solve the above-mentioned problems (problems caused by the overlapping coverage 120, the energy saving problems or the like). Examples of the technologies may include a coordinated multi-point transmission and reception (CoMP) technology, carrier aggregation and the like.

In order to support the CoMP operation for the inter-base station interference control and cooperative communication in the 3GPP standard, the terminal separately measures channel information from neighboring base stations including a serving base station and defines a signal between the base station and the terminal that may fed back to the serving base station. For the inter-base station cooperative communication, when the cooperative communication base stations are implemented in one baseband unit or uses an ideal interface without delay, various information may be exchanged between the base stations to perform the cooperative communication.

Various embodiments of the present disclosure propose a centralized cooperative communication scheme and distributed cooperative communication scheme for the inter-base station interference control and cooperative communication.

The centralized cooperative communication may be implemented in a system which includes the base station, the terminal connected to the base station, and a separate resource coordinator supporting the inter-base station cooperative communication for the inter-base station interference control and cooperative communication.

The distributed cooperative communication is directed to a network in which each base station determines whether to perform the cooperative communication.

That is, the role of coordinating the inter-base station resource for the cooperative communication may be performed by the resource coordinator which is a separate network entity or may be performed by each base station.

Various embodiments of the present disclosure describe a cooperative communication method in a network using an interface in which a transmission delay occurs and transmission capacity is limited, in an interface between the resource coordinator and the base station or an interface between the base stations for the cooperative communication.

Figure 2:
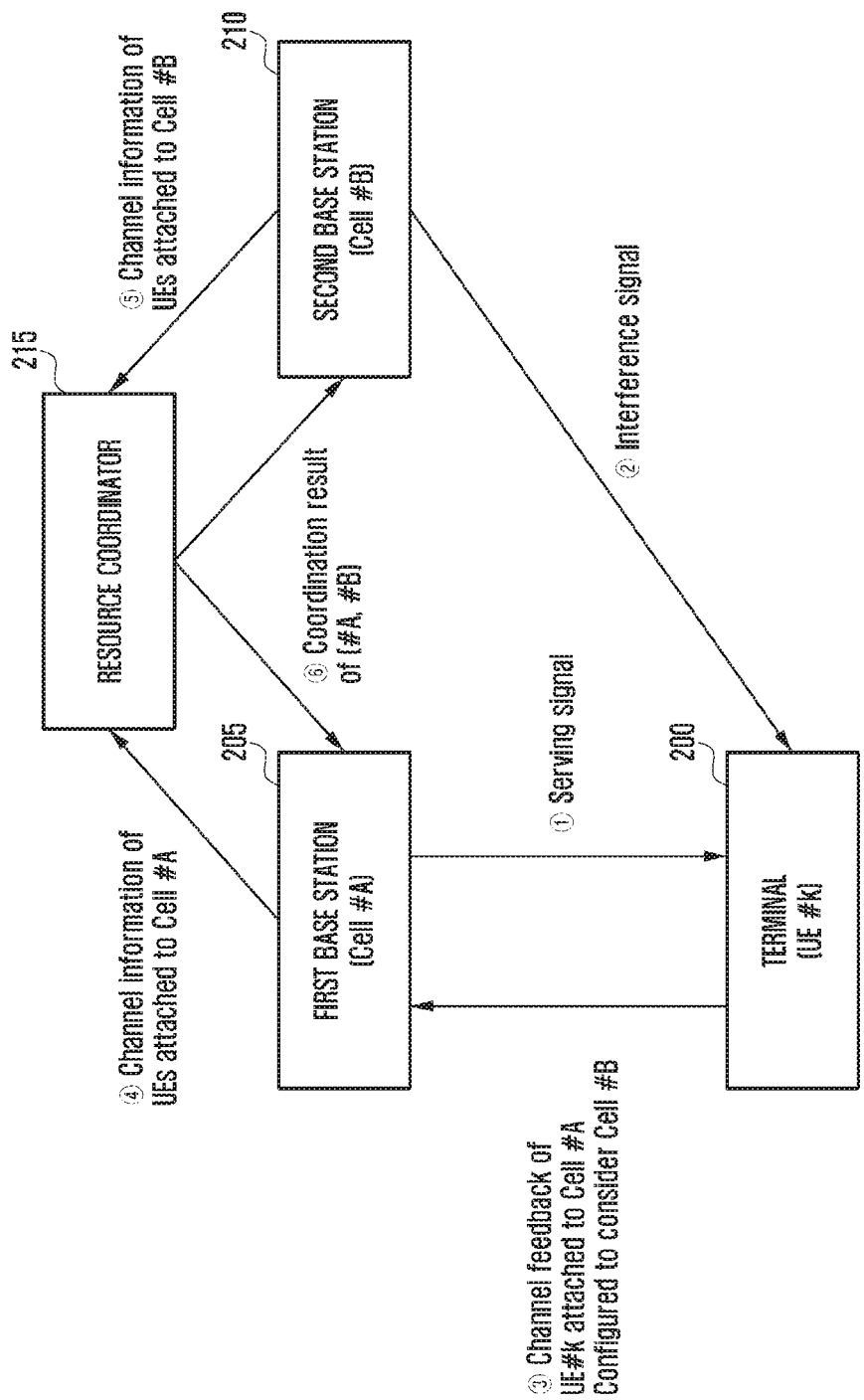
FIG. 2 is a diagram schematically illustrating a configuration and an operation of a wireless communication system supporting centralized cooperative communication according to an embodiment of the present disclosure.

FIG. 2 is a diagram schematically illustrating a configuration and an operation of a wireless communication system supporting centralized cooperative communication according to an embodiment of the present disclosure.

Referring to FIG. 2, the centralized cooperative communication is a network of a scheme in which a resource coordinator 215 generates interference control and cooperative communication results for each base station 205 and 210 in a centralized manner for the inter-base station interference control and cooperative communication and shares the results.

For example, the resource coordinator 215 may restrict the resource use of each base station in a specific time and frequency resource in consideration of the inter-base station interference and whether to use resources based on the information (e.g., base station resource information, information of the terminal connected to the base station cell and the like) that each of the base stations 205 and 210 transmits. The resource coordinator 215 shares the resource use restriction with the neighboring base stations 205 and 210.

The neighboring base stations 205 and 210 perform resource allocation to the terminal depending on the resource use restriction of each base station and allocate resources to the terminal having a high gain depending on the presence/absence of the interference according to the resource use restriction, thereby improving data transmission performance.

The information exchange and operation required in the centralized cooperative communication scheme based on FIG. 2 will be described below.

Each terminal 200 (e.g., UE #k) receives a signal from the serving base station 205 and the neighboring base station 210. For example, the serving base station 205 may be the first base station 205 managing a first cell (Cell #A), the neighboring base station 210 may be the second base station 210 managing a second cell (Cell #B). The terminal 200 receives a serving signal from the serving base station 205 and receives an interference signal from the neighboring base station 210.

The terminal 200 may feedback signal-related information (e.g., reference signal received power (RSRP) and reference signal received quality (RSRQ) of measurement report defined in the LTE system) received from the serving base station 205 and the neighboring base station 210 and channel information (e.g., channel state information (CSI) or channel quality indicator (CQI)) to the serving base station 205. At this time, the channel information may be based on the signal to interference noise ratio (SINR) of the serving base station 205 for the neighboring signals and interference. The terminal 200 may feed back a plurality of channel information, for example, CSI information, using various configuration combinations for signals and interference sources according to the 3GPP Rel.11 standard definition.

The first base station 205 receiving the channel information of the terminal 200 may transmit information to the resource coordinator 215, for example, in a form of a message 300 shown in FIG. 3. The second base station 205 may transmit the information to the resource coordinator 215 in the form of the message 300 shown in FIG. 3 based on the channel information received from the serving terminal.

The information transmitted from the base stations 205 and 210 to the resource coordinator 215 may include channel information of the terminal and/or downlink transmission resource information of each terminal in a time resource interval (1 ms=1 TTI which is minimum scheduling time).

The channel information of the terminal transmitted to the resource coordinator 215 may be, for example, the CSI received by the base stations 205 and 210 and may consist of a set of the CSI information of multiple CSI processes, respectively, according to the Rel.11 definition. In the case of the CSI information according to the multiple CSI processes, indexes for each CSI configuration is transmitted together. The index for the configuration is based on a configuration of a signal measurement resource (CSI-RS) and an interference measurement resource (IMR) for the neighboring base stations by each base station. FIG. 3 shows an example of the CSI information list for each terminal. However, the present disclosure is not limited thereto, and one of various signal-related information or channel quality information lists for each terminal may be transmitted.

In the case of the message shown in FIG. 3, it is assumed that the transmission period is 5 ms. Recently, the message may consist of the CSI information list of target terminals having downlink transmission data in each TTI unit within 5 ms. The CSI information of the terminal may be used as the latest information according to the feedback within the transmission period. In this case, only the identification of the terminal may be used.

The resource coordinator 215 receiving this message can determine a resource restriction and use of each base station in the TTI units by using the messages received from various base stations 205 and 210. In this case, the CSI information in the CSI information list for each terminal may be used so that the terminals of each of the base stations 205 and 210 predict the interference from the neighboring base stations and a gain at the time of the interference control, and the information of each terminal and/or the terminal list may be used to predict the resource level that the base station should transmit. The resource coordinator 215 may calculate a data level of each base station based on the information of each terminal and/or the terminal list, and may predict a resource level of each base station based on the data amount.

The resource coordinator 215 may generate the available resource information including the resource restriction results in consideration of the interference control gain, the resource level or the like of the neighboring base stations. For example, the resource coordinator 215 may generate the resource restriction results by performing virtual scheduling to optimize the sum of PFs of all base stations 205 and 210.

The available resource information including the resource restriction results may be shared by each base station 205 and 210 in a form of a bitmap included in a message 400 of FIG. 4. In the corresponding resource, a value of 1 may be configured when the resource is available, and a value of 0 may be configured when resource use is restricted. Of course, the opposite configuration can be made.

For example, available resource information of A cell, B cell, and C cell may be generated in units of subframes, and the transmission to the base station may be made together in a predetermined unit (e.g., predetermined period). In FIG. 4, it is assumed that results generated in units of subframes are transmitted in units of five subframes. That is, according to the present embodiment, the message transmitted to one base station by the resource coordinator 215 includes not only the resource restriction results of the corresponding base station but also the resource restriction results of the neighboring base stations, and may be divided by each application time according to the transmission period and may be transmitted as one message according to the period.

In this case, it is basically assumed that the resource restriction results for each base station are equally received by the neighboring base stations that are shared. Therefore, the base station may determine the interference of the corresponding base station based on the resource restriction results of the received neighboring base stations and reflect the interference when the data rate to the terminal is determined.

Meanwhile, the embodiment of the present disclosure proposes a method for efficiently using, by a base station having a small data amount, resources when the resource coordinator 215 generates the resource restriction results based on the resource level.

The resource coordinator 215 may configure the resource restriction result value for the corresponding base station so that the resource restriction result value for the corresponding base station is different from the resource restriction result value transmitted to the neighboring base stations when the resource level of the specific base station is equal to or less than a set reference level. For example, when the resource level of the specific base station is equal to or less than the set reference level, the resource restriction result value of the corresponding base station is configured to be a value indicating the available resource for the corresponding base station and a value indicating the resource use restriction of the neighboring base stations. By doing so, the neighboring base stations may perform scheduling for the terminal without considering the interference of the corresponding base station, and the corresponding base station may transmit data through resources shared by the neighboring base stations when it is necessary to transmit important data.

On the other hand, when there is the resource level information of each base station, the resource coordinator 215 may determine the size of the resource level by using an average or a sum of a predetermined interval based on the resource level information. If the resource level information is not explicitly present, the resource coordinator 215 may determine that there is the resource level when there is at least one terminal information in the terminal list, and may determine the size of the resource level using the average or sum in a predetermined interval.

Specifically, the resource coordinator 215 may determine the data level of each base station based on the information received from the base station and may differently configure the resource restriction results shared by the base station based on the data amount. The data amount of the specific base station may use the frequency of the transmitted terminal channel information or separate traffic information. The resource coordinator 215 may filter the data level of a predetermined time period or predict the resource level to be allocated to each base station by using an average value or the like in a time period.

When the resource level of a specific base station (e.g., the base station managing the Cell #A) is equal to or lower than the set reference level, the resource coordinator 215 may make a difference in the transmission of the resource restriction results for the specific base station to the corresponding base station and the transmission of the resource restriction results to the neighboring base stations (e.g., the base station managing the Cell #B and the base station managing the Cell #C). The reference may be, for example, an absolute value, or a relative value based on the resource level value of the base stations. Referring to messages 500 and 505 of FIG. 5, when the resource level of a specific base station (for example, base station managing Cell #A) is equal to or less than the set reference level, the message 500 in which a bitmap 1 value 505 indicating an available resource is configured may be transmitted to the specific base station for a predetermined interval (e.g., five subframe intervals) for the Cell #A and the message 510 in which a bitmap 0 value 515 indicating the resource use restriction is configured may be transmitted to the neighboring base stations (base station managing the Cell #B and base station managing the Cell #C) for the predetermined period for the Cell #A. By doing so, the neighboring base station may determine the data rate at the time of terminal data allocation, under the assumption that the interference from the specific base station is restricted. In addition, the specific base station having a very small amount of resource may directly transmit very small data, important terminal connection related data or the like using a resource when transmitting the data or the like. At this time, for the Cell #B and the Cell #C, all base stations share the same resource use restriction results in the corresponding time period.

Figure 6:
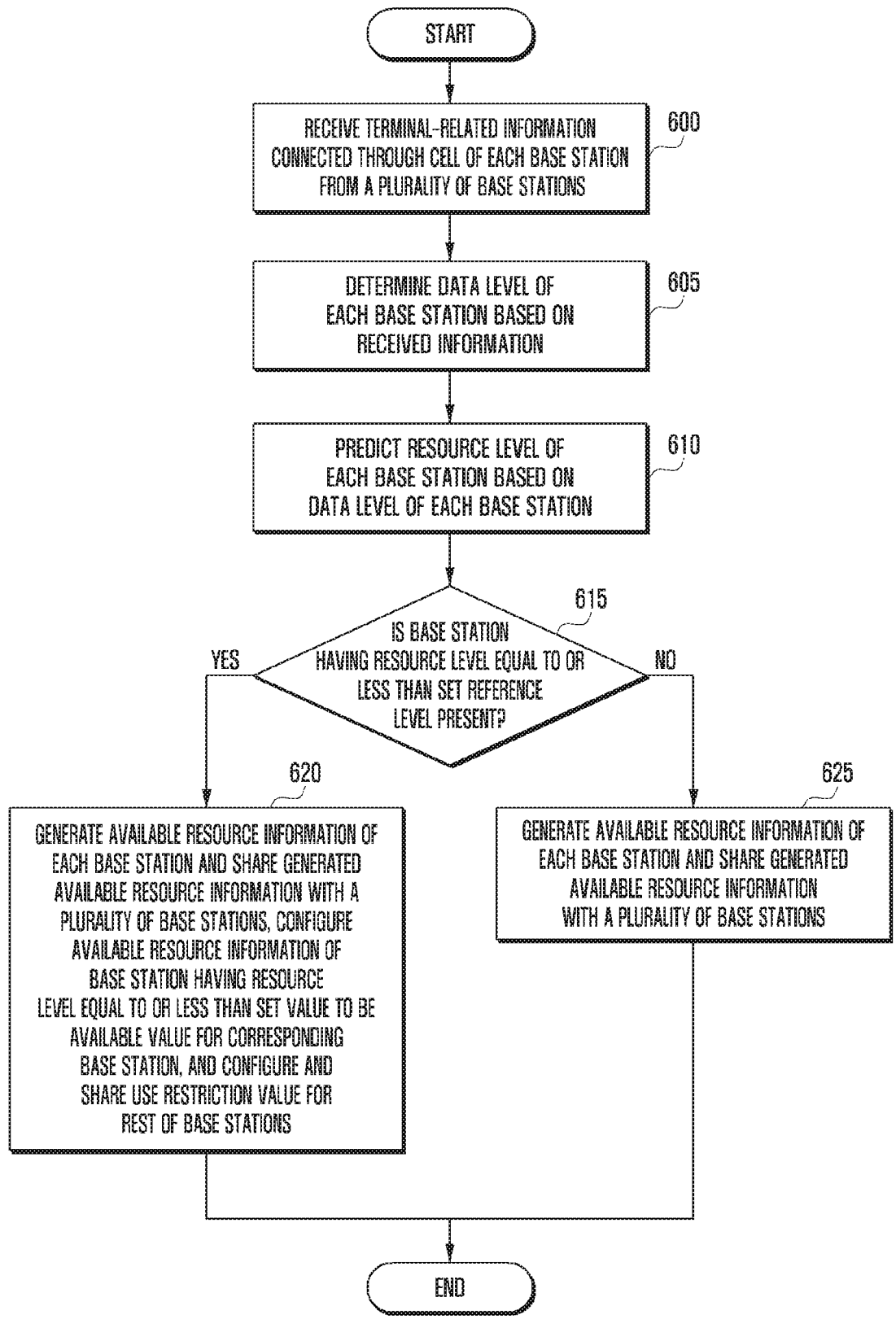
FIG. 6 is a flowchart illustrating an operation of the resource coordinator according to the embodiment of the present disclosure.

FIG. 6 is a flow chart illustrating an example of the operation of a resource coordinator (e.g., 215) that supports the cooperative communication according to the embodiment of the present disclosure.

In step 600, the resource coordinator 215 may receive the terminal-related information from the plurality of base stations through the cells of each base station. As described above, the terminal-related information may include signal-related information and/or channel information received by the terminal, and may specifically include a CSI information list for each terminal.

In step 605, the resource coordinator 215 may determine the data level of each base station based on the received information. For example, the resource coordinator 215 may determine the data level of each base station by using the frequency of the transmitted terminal channel information or the separate traffic information.

In step 610, the resource coordinator 215 may determine the resource level of each base station based on the data mount for each base station. For example, the resource coordinator 215 may filter the data level of a predetermined time period or predict the resource level to be allocated to each base station by using an average value or the like in a time period.

In step 615, the resource coordinator 215 may determine whether the base station having a predicted resource level equal to or less than the set reference level is present. The resource coordinator 215 may determine the size of the resource level using an average or a sum of the predetermined interval of the resource level.

If the base station having the predicted resource level equal to or less than the set reference level is determined, in step 620, the resource coordinator 215 may generate the available resource information of each base station and share the generated available resource information with the plurality of base stations, and may configure the available resource information of the determined base station to be different values for the determined base station and the rest of the base stations and transmit the configured available resource information. For example, the resource coordinator 215 may configure the available resource information of the determined base station to be a value indicating the available resource information of the determined base station and transmit the configured available resource information, and configure the available resource information of the determined base station to be a value indicating the resource use restriction of the rest of the base stations and transmit the configured available resource information. At this time, the available resource information of the rest of the base stations may allow the plurality of base stations to share the same value that the resource coordinator 215 configures.

On the other hand, if the base station having the predicted resource level equal to or less than the set reference value is not determined, in step 625, the resource coordinator 215 may generate available resource information of each base station and share the generated available resource information with the plurality of base stations. At this time, the available resource information of the plurality of base stations may allow the plurality of base stations to share the same value that the resource coordinator 215 configures.

Figure 7:
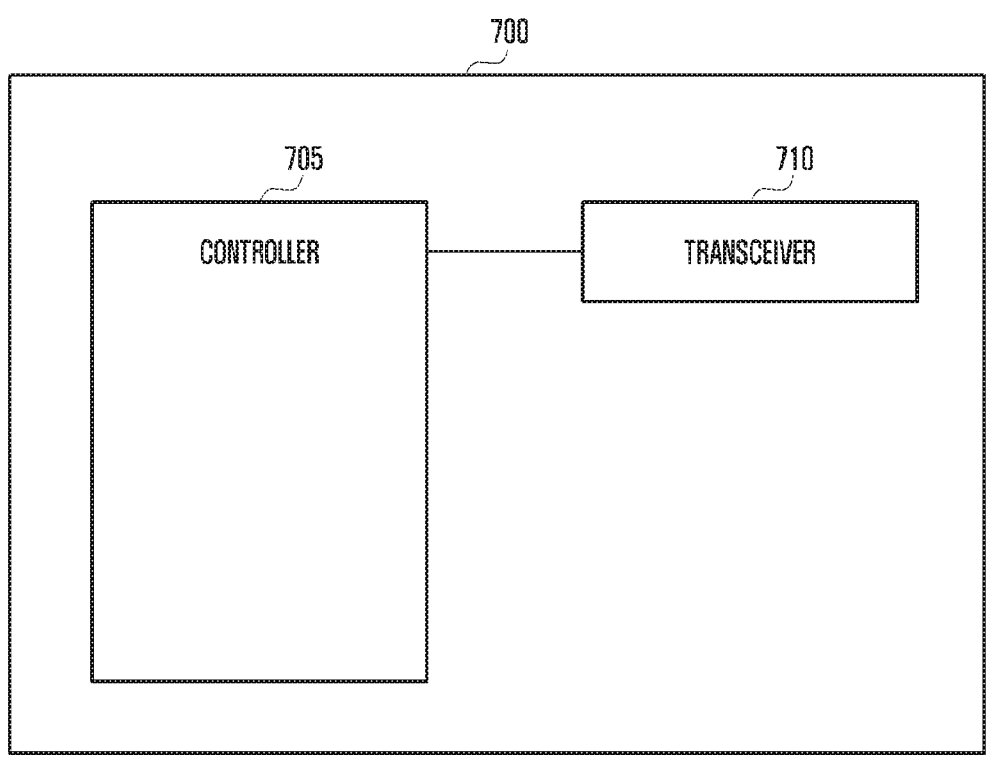
FIG. 7 is a block diagram illustrating a schematic configuration of the resource coordinator according to the embodiment of the present disclosure.

FIG. 7 is a block diagram illustrating a schematic configuration of a resource coordinator 700 according to the embodiment of the present disclosure.

The resource coordinator 700 may include at least a controller 705 and a transceiver 710.

The transceiver 710 may transmit and receive a signal to and from the plurality of base stations based on the control of the controller 705.

The controller 705 serves to control the overall operation of the resource coordinator described above.

For example, the controller 705 may predict the resource level of each base station based on the information received from the plurality of base stations. The base station may determine the base station having the resource level equal to or less than the set reference level among the plurality of base stations and configure the available resource information of the determined base station to be different values for the determined base station and the rest of the base stations. The information received from the plurality of base stations may include at least one of the channel information and the downlink transmission request resource information of at least one terminal connected to each of the base stations through the cell. The controller 705 may determine whether the resource level is equal to or less than the predetermined value based on the resource level of a predetermined interval.

The controller 705 may perform a control to configure the available resource information of the determined base station to be a value indicating the available resource information of the determined base station and transmit the configured available resource information to the plurality of base stations, and configure the available resource information of the determined base station to be a value indicating the resource use restriction of the rest of the base stations and transmit the configured available resource information to the plurality of base stations.

The controller 705 may determine the data level of each base station based on the information received from each base station and predict the resource level of each base station based on the data level of each base station.

The controller 705 may perform a control to generate the available resource information of the rest of the base stations based on the resource level of each base station and transmit the available resource information of the rest of the base stations to the plurality of base stations. At this time, the available resource information of the determined base station and the available resource information of the rest of the base stations may be generated by each unit time, and may be transmitted as one message to the plurality of base stations based on a preset transmission period.

Figure 8:
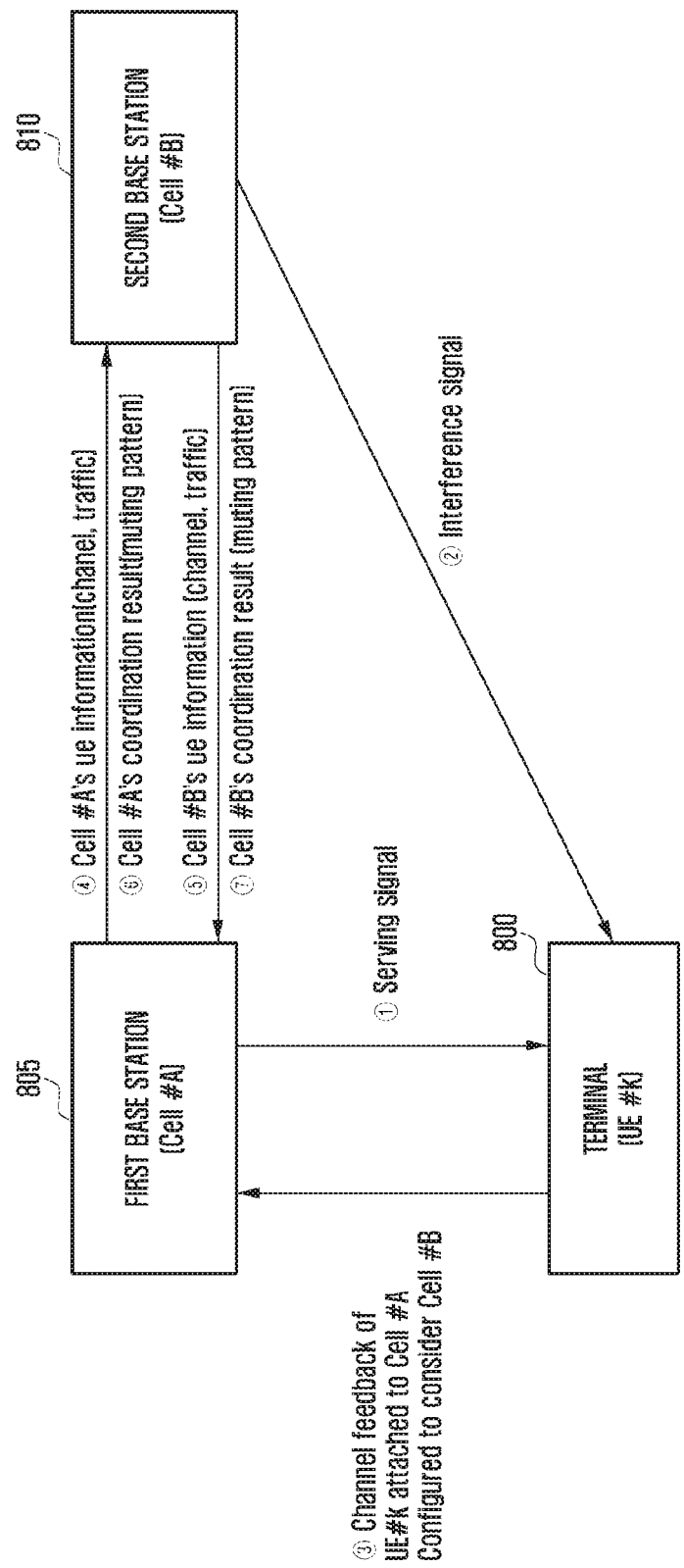
FIG. 8 is a diagram schematically illustrating a configuration and an operation of a wireless communication system supporting centralized cooperative communication according to another embodiment of the present disclosure.

FIG. 8 is a diagram schematically illustrating a configuration and an operation of a wireless communication system supporting centralized cooperative communication according to another embodiment of the present disclosure.

Referring to FIG. 8, the distributed cooperative communication is a network of a type in which each base station 805 and 810 directly generates and shares a cooperative communication result for the inter-base station interference control and cooperative communication.

In the distributed architecture, the base station 805 may determine whether to restrict its own resource use in a specific time and frequency resource by directly transmitting and receiving data to and from the neighboring base station 810 without passing through a separate network entity. In addition, the determined resource use restriction may be shared with the neighboring base station 810.

The neighboring base station 810 may also determine whether to restrict its own resource use in the same manner and share the determined resource use restriction with the base station 805. The base station 805 may perform the resource allocation to the terminal depending on its own resource use restriction and allocate a resource to a terminal having a high gain depending on the presence/absence of the interference depending on the resource use restriction, thereby improving the data transmission performance.

The information exchange and operation required in the distributed cooperative communication scheme based on FIG. 8 will be described below.

Each terminal 800 (e.g., UE #k) receives a signal from the serving base station 805 and the neighboring base station 810. For example, the serving base station 805 may be the first base station 805 managing the first cell (Cell #A), the neighboring base station 810 may be the second base station 810 managing the second cell (Cell #B). The terminal 800 receives a serving signal from the serving base station 805 and receives an interference signal from the neighboring base station 810.

The terminal 800 may feedback signal-related information (e.g., reference signal received power (RSRP) and reference signal received quality (RSRQ) of measurement report defined in the LTE system) received from the serving base station 805 and the neighboring base station 810 and channel information (e.g., channel state information (CSI) or channel quality indicator (CQI)) to the serving base station 805. At this time, the channel information may be based on the signal to interference noise ratio (SINR) of the serving base station 805 for the neighboring signals and interference. The terminal 800 may feed back a plurality of channel information, for example, CSI information, using various configuration combinations of for signals and interference sources according to the 3GPP Rel.11 standard definition.

In the distributed architecture, the information that the base station 805 transmits to the neighboring base station 810 (or vice versa) may include serving base station information used when the neighboring base station performs the resource use coordination (e.g., signal-related information that the terminal receives, traffic information of the terminal, traffic information, or information utilizing the same) and the resource use coordination result determined by the serving base station (i.e., available resource information of the serving base station).

Figure 9:
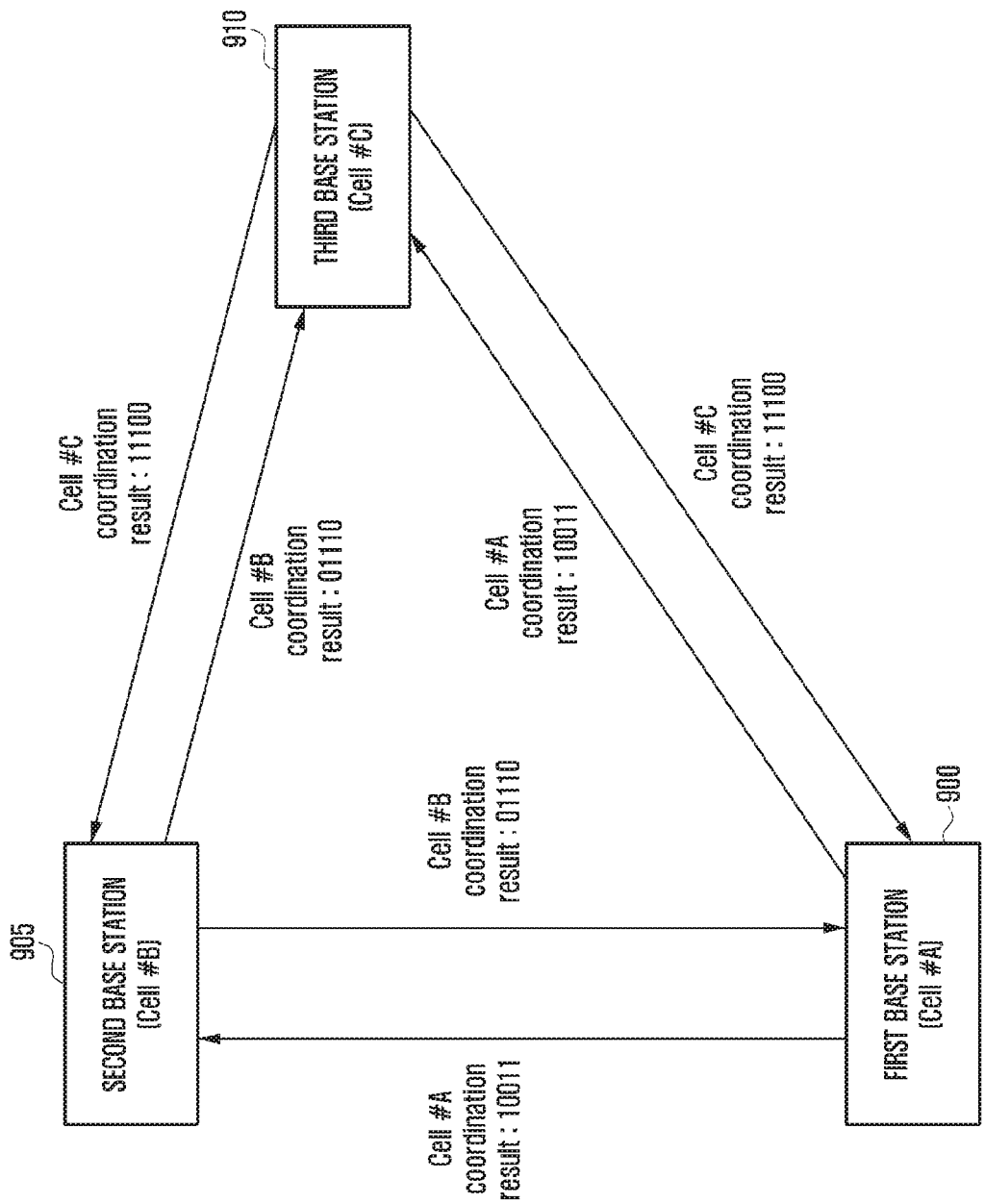
FIG. 9 is a diagram illustrating an operation in which base stations share resource use coordination result information in the distributed cooperative communication according to another embodiment of the present disclosure.

For example, referring to FIG. 9, base stations 900 to 910 managing Cell #A, Cell #B, and Cell #C may exchange resource use coordination results with each other. For example, the base station 900 managing the cell #A may transmit its own resource use coordination results to neighboring base stations 905 and 910, and receive the resource use coordination results of each base station from the neighboring base stations 905 and 910. The operations of the base stations 905 and 910 that manage the Cell #B or the Cell #C are also the same.

For example, as illustrated in FIG. 10, the resource use coordination results of each base station transmitted between the base stations may include messages 1000 and 1005 including a value indicating the resource use restriction or whether to use the resource in a subframe unit for a predetermined interval (e.g., five subframe intervals) for the cells (Cell #A, Cell #C) of the base stations 900 and 910. That is, the base station 905 may receive the messages 1000 and 1005 from the neighboring base stations 900 and 910, and synthesize the messages 1000 and 1005 to generate a list of the resource use coordination results 1010 of the neighboring base stations.

On the other hand, for example, when the base station 900 managing the Cell #A determines that its own predicted resource level is equal to or less than the set reference level, the resource use coordination results to be transmitted to the neighboring base stations 905 and 910 may be configured to be a value indicating the resource use restriction (e.g., configured to be a bitmap 0 value). That is, the base station 900 may share the resource coordination results indicating that the neighboring base stations 905 and 910 are always in the output off state. In the distributed architecture, there is no difference between the resource coordination results received by the neighboring base stations, unlike the centralized type. However, when a very small amount of data, main terminal connection related data or the like are transmitted, that is, when a traffic amount equal to or more than the set reference level is not generated, the base station 900 transmitting the value indicating the resource use restriction to the neighboring base stations by determining that the resource level is equal to or less than the set reference level may perform the resource transmission to the neighboring cells due to even in the shared subframe due to the resource use restriction. On the other hand, the operation of the base station 900 that predicts the resource level and determines the resource use restriction may be performed similar to the operation in the resource coordinator 215 described above. However, the resource coordinator 215 determines the resource use restriction of all the base stations receiving the signal, while the base station 900 in the present embodiment determines only its own resource use restriction and shares the determined resource use restriction with the neighboring base stations 905 and 910.

Figure 11:
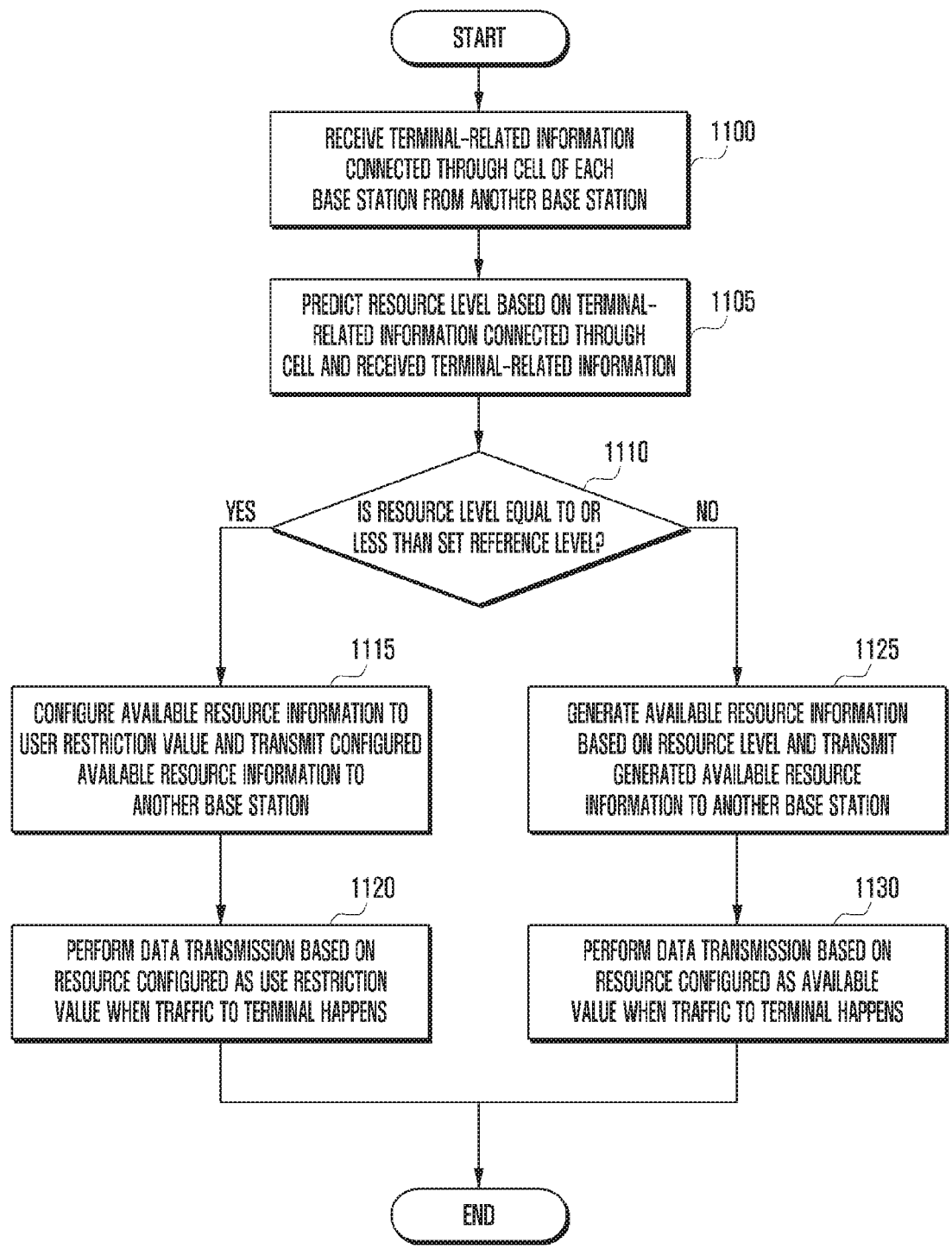
FIG. 11 is a diagram illustrating an operation of a base station according to another embodiment of the present disclosure.

FIG. 11 is a flowchart illustrating an example of the operation of the base station (e.g., 900) that supports the cooperative communication according to another embodiment of the present disclosure.

In step 1100, the base station 900 may receive the terminal-related information from the neighboring base station through the cells of each base station. The terminal-related information may include the signal-related information received by the terminal, the channel information of the terminal, the traffic information, or the information utilizing the same.

In step 1105, the base station 900 may predict the resource level of the base station 900 based on the terminal-related information connected through the cell (Cell #A) and the received terminal-related information. For example, the base station 900 may use the frequency or traffic information of the channel information of each base station to determine the data level of each base station. The resource level of the base station 900 can be predicted based on the data amount of each base station. The base station 900 may predict the resource level of all the base stations or only the resource level of the corresponding base station 900. For example, the base station 900 may filter the data level of the certain period of time or predict the resource level using the average value or the like in the time period.

In step 1110, the base station 900 may determine whether the predicted resource level is equal to or less than the set reference level. The base station 900 may determine the size of the resource level using the average or a sum of the predetermined interval of the resource level.

If the predicted resource level is equal to or less than the set reference level, in step 1115, the base station 900 may configure its own available resource information to be the use restriction value and transmit the available resource information to the neighboring base stations. In step 1120, the base station 900 may perform the data transmission even based on resources configured as the use restriction value when the traffic to the terminal is generated. That is, when transmitting the very small amount of data, the main terminal connection related data or the like, that is, when the traffic amount exceeding the set reference value does not happen, the base station 900 may transmit resources even in the subframes shared by neighboring cells due to the resource use restriction.

On the other hand, if the predicted resource level exceeds or equal to or more than the set reference level, in step 1125, the base station 900 may generate the available resource information based on the resource level and transmit the generated available resource information to another base station. In this case, in step 1130, the base station 900 may perform the data transmission based on the resources configured as the available value when the traffic to the terminal happens. That is, unlike the step 1120, in the step 1130, the data transmission may not be performed based on the resources configured as the use restriction value.

Figure 12:
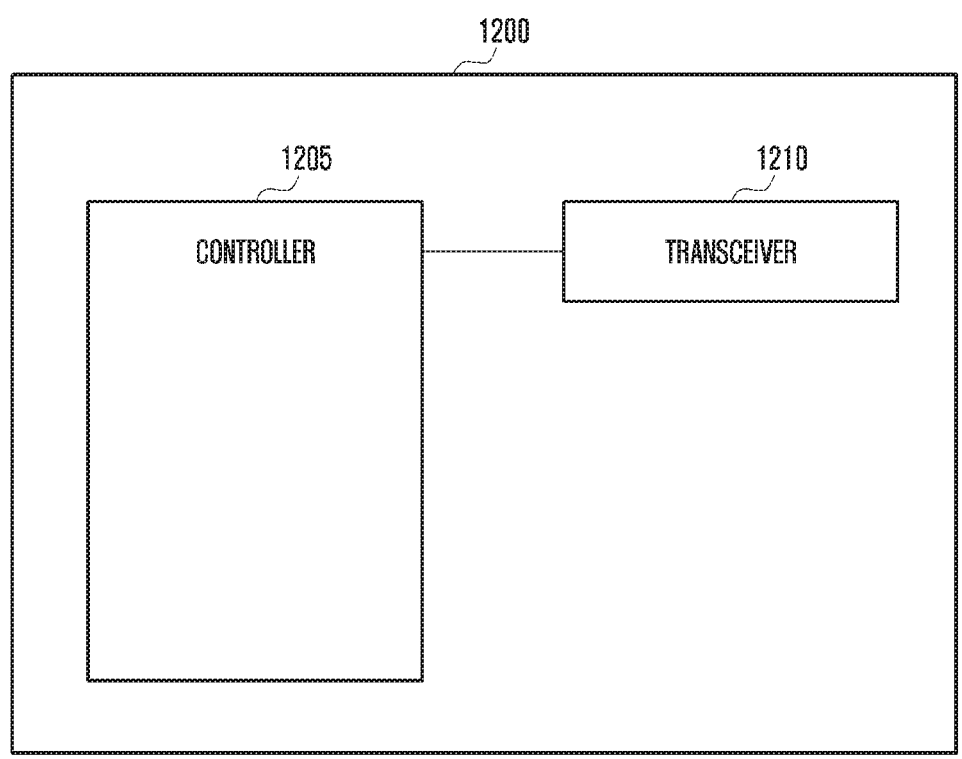
FIG. 12 is a block diagram schematically illustrating a configuration of the base station according to another embodiment of the present disclosure.

FIG. 12 is a block diagram schematically illustrating a configuration of a base station 1200 according to another embodiment of the present disclosure.

The transmitter 1200 may at least include a controller 1205 and a transceiver 1210.

The transceiver 1210 may transmit and receive the signal to and from the neighboring base stations based on the control of the controller 1205.

The controller 1205 serves to control the overall operation of the base station described above.

For example, the controller 1205 may a control to receive the terminal-related information transmitted from another base station through the cells of each base station, and predict the resource level of the base station based on the received terminal-related information. The terminal-related information may include the signal-related information received by the terminal, the channel information of the terminal, the traffic information (downlink transmission request resource information), or the information utilizing the same.

When the resource level is equal to or less than the set reference level, the controller 1205 may perform a control to configure the available resource information of the base station to be the value indicating the resource use restriction and transmit the configured available resource information to another base station.

The controller 1205 may perform a control to transmit data even if the available resource information is configured to be a value indicating the resource use restriction when the traffic to the terminal connected through the cell of the base station happens.

The controller 1205 may determine the data level for each base station based on the terminal-related information of the base station and the terminal-related information received from another base station, and predict the resource level of the base station based on the data level for each base station. The controller 1205 may determine whether the resource amount is equal to or less than the predetermined value based on the resource level of the set interval.

The controller 1205 may perform a control to receive the available resource information of another base station from another base station. The controller 1205 may determine the data transmission rate to the terminal connected through the cell of the base station in consideration of the interference or the like, based on the received available resource information of another base station.

The operations of the resource coordinator or the base station described above may be realized by including the memory device storing the corresponding program code in the resource coordinator or any component in the base station apparatus. That is, the controller of the base station or the terminal apparatus may execute the above-described operations by reading and executing the program code stored in the memory device by a processor or a central processing unit (CPU).

Various components, modules, etc. of the entity, the base station, or the terminal apparatus described herein may also be operated using hardware circuits, for example, complementary metal oxide semiconductor (CMOS) based logic circuit, hardware circuits such as firmware, software, and/or a combination of the hardware and the firmware and/or software embedded in a machine-readable medium. For example, various electrical structures and methods may be performed using electrical circuits such as transistors, logic gates, and an application-specific integrated circuit.

Although the exemplary embodiments of the present disclosure have been disclosed for illustrative purposes, various modifications, additions and substitutions are possible, without departing from the scope and spirit of the invention as disclosed in the accompanying claims. Accordingly, the scope of the present disclosure is not construed as being limited to the described embodiments but is defined by the appended claims as well as equivalents thereto.

The invention claimed is:

1. A method for cooperative communication of electronic devices in a wireless communication system, comprising:
    receiving resource information for data transmission of each base station from a plurality of base stations;
    determining a first base station satisfying a criteria, based on the received resource information among the plurality of base stations;
    differently configuring first available resource information on the first base station for the first base station and second available resource information on the first base station for a second base station other than the first base station; and
    transmitting the first available resource information to the first base station and the second available resource information to the second base station.

2. The method of claim 1, wherein the configuring of the first available resource information and the second available resource information comprises:
    configuring the first available resource information on the first base station to be a value indicating an available resource for the first base station; and
    configuring the second available resource information on the first base station to be a value indicating a resource use restriction for the second base station.

3. The method of claim 1, wherein the resource information received from the plurality of base stations includes at least one of channel information and downlink transmission request resource information of at least one terminal connected through a cell of each base station.

4. The method of claim 1, wherein the determining of the first base station is made based on the resource information for data transmission of each base station for a configured time interval.

5. The method of claim 1, further comprising:
    generating third available resource information on the second base station based on the resource information for data transmission of each base station; and
    transmitting the third available resource information on the second base station to the plurality of base stations.

6. The method of claim 5, wherein the first available resource information, the second available resource information, and the third available resource information are generated by each time unit, and transmitted to the plurality of base stations based on a preconfigured transmission period.

7. The method of claim 1, further comprising:
    identifying resource level for data transmission of each base station based on the resource information; and
    wherein the determining of the first base station comprises determining the first base station having the resource level equal to or less than a reference level among the plurality of base stations.

8. The method of claim 7, wherein the identifying of the resource level for data transmission of each base station includes:
    determining a data level of each base station based on the information received from each base station; and
    identifying the resource level for data transmission of each base station based on the data level of each base station.

9. The method of claim 1, wherein resource allocation is performed by the plurality of base stations based on a gain and interference according to the first available resource information, the second available resource information, and third available resource information.

10. An electronic device, comprising:
    a transceiver configured to transmit and receive a signal to and from a plurality of base stations; and
    a controller configured to perform a control to:
        receive resource information for data transmission of each base station from the plurality of base stations,
        determine a first base station satisfying a criteria, based on the received information among the plurality of base stations,
        differently configure first available resource information on the first base station for the first base station and second available resource information on the first base station for a second base station other than the first base station, and transmit the first available resource information to the first base station and the second available resource information to the second base station.

11. The electronic device of claim 10, wherein the controller further performs a control to:
configure the first available resource information on the first base station to be a value indicating an available resource for the first base station; and
configure the second available resource information on the first base station to be a value indicating a resource use restriction for the second base station.

12. The electronic device of claim 10, wherein the resource information received from the plurality of base stations includes at least one of channel information and downlink transmission request resource information of at least one terminal connected through a cell of each base station.

13. The electronic device of claim 10, wherein the controller is further configured to determine a data level of each base station based on the information received from each base station and identify the resource level for data transmission of each base station based on the data level of each base station.

14. The electronic device of claim 10, wherein the controller is further configured to determine the first base station based on the resource information for data transmission of each base station for a configured time interval.

15. The electronic device of claim 10, wherein the controller is further configured to perform a control to:
generate third available resource information on the second base station based on the resource information for data transmission of each base station; and
transmit the third available resource information on the second base station to the plurality of base stations.

16. The electronic device of claim 15, wherein the first available resource information, the second available resource information, and the third available resource information are generated by each time unit, and transmitted to the plurality of base stations based on a preconfigured transmission period.

17. The electronic device of claim 10, wherein the controller is further configured to perform a control to:
identify resource level for data transmission of each base station based on the resource information, and
determine the first base station having the resource level equal to or less than a reference level among the plurality of base stations.

18. The electronic device of claim 10, wherein resource allocation is performed by the plurality of base stations based on a gain and interference according to the first available resource information, the second available resource information and third available resource information.

* * * * *